US012040123B2

(12) United States Patent
Lee et al.

(10) Patent No.: US 12,040,123 B2
(45) Date of Patent: Jul. 16, 2024

(54) COIL COMPONENT

(71) Applicant: SAMSUNG ELECTRO-MECHANICS CO., LTD., Suwon-si (KR)

(72) Inventors: Dong Hwan Lee, Suwon-si (KR); Dong Jin Lee, Suwon-si (KR); Chan Yoon, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 561 days.

(21) Appl. No.: 17/229,930

(22) Filed: Apr. 14, 2021

(65) Prior Publication Data

US 2021/0398740 A1 Dec. 23, 2021

(30) Foreign Application Priority Data

Jun. 18, 2020 (KR) ........................ 10-2020-0074299

(51) Int. Cl.
*H01F 27/29* (2006.01)
*H01F 17/00* (2006.01)
*H01F 27/32* (2006.01)

(52) U.S. Cl.
CPC ....... *H01F 27/292* (2013.01); *H01F 17/0013* (2013.01); *H01F 27/324* (2013.01)

(58) Field of Classification Search
CPC ... H01F 27/292; H01F 17/0013; H01F 27/324
See application file for complete search history.

(56) References Cited

U.S. PATENT DOCUMENTS 9,536,647 B2 1/2017 Hahn et al.
10,763,033 B2 9/2020 Tachibana et al.
(Continued)

FOREIGN PATENT DOCUMENTS

CN 103680815 A 3/2014
CN 104810131 A 7/2015
(Continued)

OTHER PUBLICATIONS

Korean Office Action dated Oct. 2, 2021 issued in Korean Patent Application No. 10-2020-0074299 (with English translation).
(Continued)

*Primary Examiner* — Malcolm Barnes
(74) *Attorney, Agent, or Firm* — Morgan, Lewis & Bockius LLP

(57) ABSTRACT

A coil component includes a body having end surfaces opposing each other and side surfaces connecting the end surfaces and opposing each other, a support substrate disposed within the body and having a first surface and a second surface opposing each other, first and second coil units disposed on the first surface and the second surface of the support substrate, respectively, and each including a plurality of turns, and lead portions connected to the first and second coil units and exposed to a first end surface and a second end surface of the body, respectively. A shortest distance from an outermost turn of the first coil unit to the second end surface of the body is greater than a shortest distance from the outermost turn of the first coil unit to a first side surface of the body.

20 Claims, 7 Drawing Sheets

(56) References Cited

U.S. PATENT DOCUMENTS

| | | | | |
|---|---|---|---|---|
| 11,205,539 | B2 | 12/2021 | Jung et al. | |
| 2010/0253464 | A1* | 10/2010 | Miyoshi | H01F 17/0013 336/200 |
| 2013/0222101 | A1* | 8/2013 | Ito | H01F 3/08 336/83 |
| 2014/0062643 | A1* | 3/2014 | Hahn | H01F 17/0033 336/200 |
| 2014/0184376 | A1* | 7/2014 | Yoon | H01F 17/0006 336/200 |
| 2016/0104563 | A1* | 4/2016 | Jeong | H01F 17/0013 336/200 |
| 2016/0189850 | A1* | 6/2016 | Lee | H01F 27/292 336/200 |
| 2017/0032883 | A1* | 2/2017 | Hong | H01F 41/046 |
| 2017/0125158 | A1* | 5/2017 | Shoda | H01F 41/076 |
| 2017/0243689 | A1* | 8/2017 | Yoon | H01F 17/04 |
| 2018/0033538 | A1 | 2/2018 | Yoon et al. | |
| 2018/0350505 | A1* | 12/2018 | Ryu | H01F 17/0013 |
| 2018/0358171 | A1* | 12/2018 | Jung | H01F 17/0013 |
| 2019/0115143 | A1* | 4/2019 | Tachibana | H01F 27/292 |

FOREIGN PATENT DOCUMENTS

| | | | | |
|---|---|---|---|---|
| CN | 109087775 | A | 12/2018 | |
| CN | 109671558 | A | 4/2019 | |
| JP | 2010-062386 | A | 3/2010 | |
| JP | 4724264 | B2 | 7/2011 | |
| JP | 10-2019-0042458 | A | 4/2019 | |
| KR | 10-2014-0037639 | A | 3/2014 | |
| KR | 10-2014-0086414 | A | 7/2014 | |
| KR | 10-2015-0089163 | A | 8/2015 | |
| KR | 20150089163 | A * | 8/2015 | H01F 17/00 |
| KR | 10-2018-0012618 | A | 2/2018 | |
| KR | 10-2018-0135778 | A | 12/2018 | |

OTHER PUBLICATIONS

Office Action dated Nov. 20, 2023 issued in the corresponding Chinese Patent Application No. 202110612469.0 with English tranlation.

Office Action issued on Feb. 29, 2024 in Chinese Patent Application No. 202110612469.0 with English translation.

* cited by examiner

-RELATED ART-

-RELATED ART-

COIL COMPONENT

CROSS-REFERENCE TO RELATED APPLICATION(S)

This application claims the benefit of priority to Korean Patent Application No. 10-2020-0074299, filed on Jun. 18, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices together with a resistor and a capacitor.

As electronic devices increasingly have high performance and have become compact, coil components used in electronic devices have been increased in number and miniaturized.

Accordingly, a necessity to improve frequency characteristics by minimizing parasitic capacitance inside an inductor has increased.

SUMMARY

Exemplary embodiments provide a coil component having improved frequency characteristics by minimizing parasitic capacitance.

Exemplary embodiments provide a coil component having improved inductance characteristics of a body having a limited volume.

According to an aspect of the present disclosure, a coil component includes: a body having end surfaces opposing each other and side surfaces connecting the end surfaces and opposing each other; a support substrate disposed within the body and having a first surface and a second surface opposing each other; first and second coil units disposed on the first surface and the second surface of the support substrate, respectively, and each including a plurality of turns; and lead portions connected to the first and second coil units and exposed to a first end surface and a second end surface of the body, respectively. A shortest distance from an outermost turn of the first coil unit to the second end surface of the body is greater than a shortest distance from the outermost turn of the first coil unit to a first side surface of the body.

According to another aspect of the present disclosure, a coil component includes: a body having a first end surface and a second end surface opposing each other in a first direction and a first side surface and a second side surface connecting the first end surface and the second end surface and opposing each other in a second direction; a support substrate disposed within the body; a coil unit disposed on at least one surface of the support substrate and including a plurality of turns; first and second lead portions extending from two opposing ends of the coil unit and exposed to the first end surface and the second end surface of the body, respectively. The body includes a first margin portion disposed between an outermost surface of the coil unit, opposing the first lead portion in the first direction, and the second end surface of the body or between an outermost surface of the coil unit, opposing the second lead portion in the first direction, and the first end surface of the body. The body further includes a second margin portion disposed between an outermost surface of the coil unit with respect to the second direction and the first or second side surface of the body. A shortest length of the first margin portion in the first direction is greater than a shortest distance of the second margin portion in the second direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
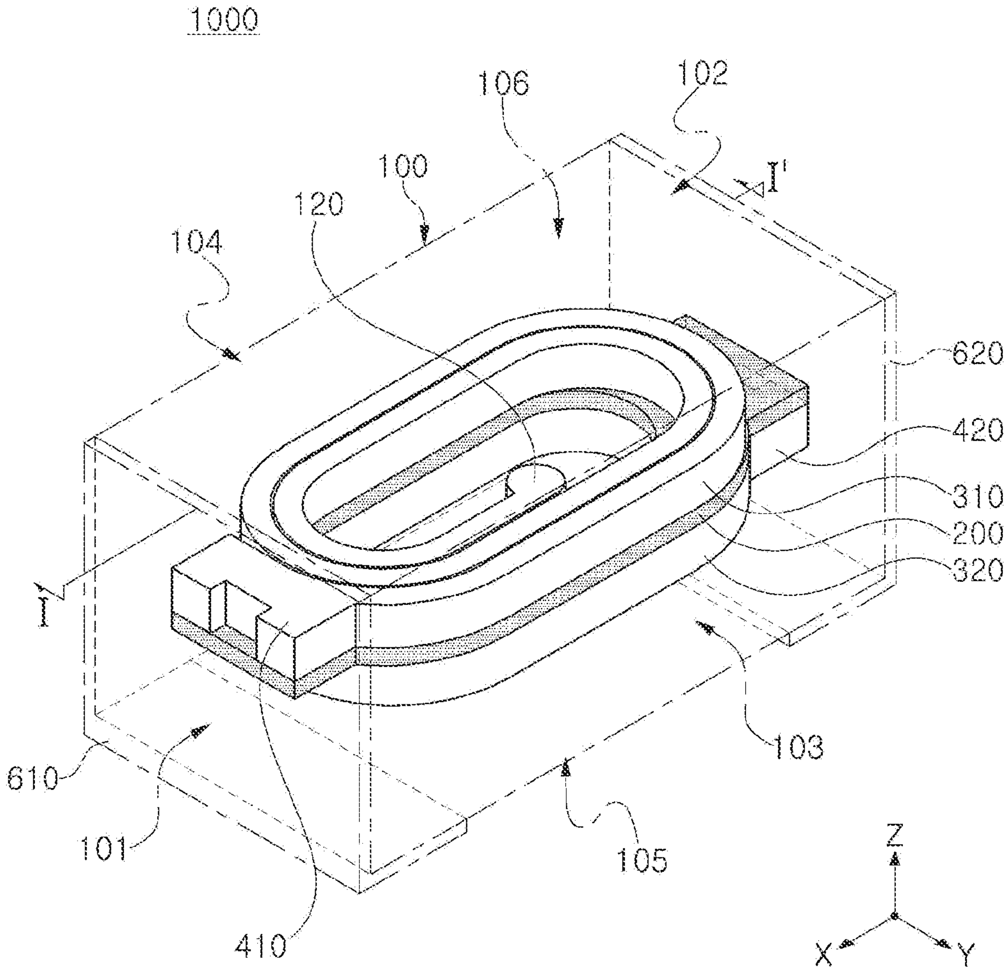
FIG. 1 is a view schematically illustrating a coil component according to a first exemplary embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or exemplary embodiment, e.g., as to what an example or exemplary embodiment may include or implement, means that at least an example or exemplary embodiment exists in which such a feature is included or implemented while all examples and exemplary embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

In the drawings, an X direction may be defined as a first direction or a length direction, a Y direction may be defined as a second direction or a width direction, and a Z direction may be defined as a third direction or a thickness direction.

Hereinafter, a coil component according to an exemplary embodiment in the present disclosure will be described in detail with reference to the accompanying drawings, and in the description with reference to the accompanying drawings, the like or corresponding components are given the same reference numerals and redundant descriptions thereof will be omitted.

Various types of electronic components are used in electronic devices, and various types of coil components may be appropriately used between the electronic components for the purpose of canceling noise or the like.

That is, in an electronic device, a coil component may be used as a power inductor, a high frequency (HF) inductor, a general bead, a high frequency (GHz) bead, a common mode filter, and the like.

First Exemplary Embodiment

Figure 2:
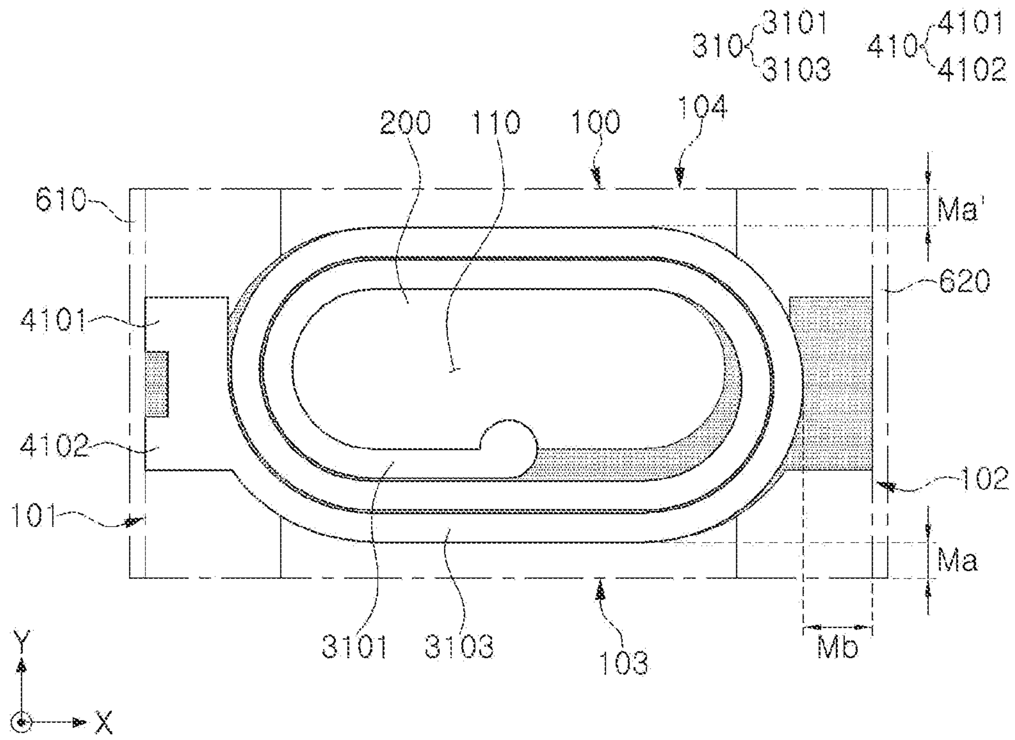
FIG. 2 is a schematic top view of the coil component of FIG. 1.
Figure 3:
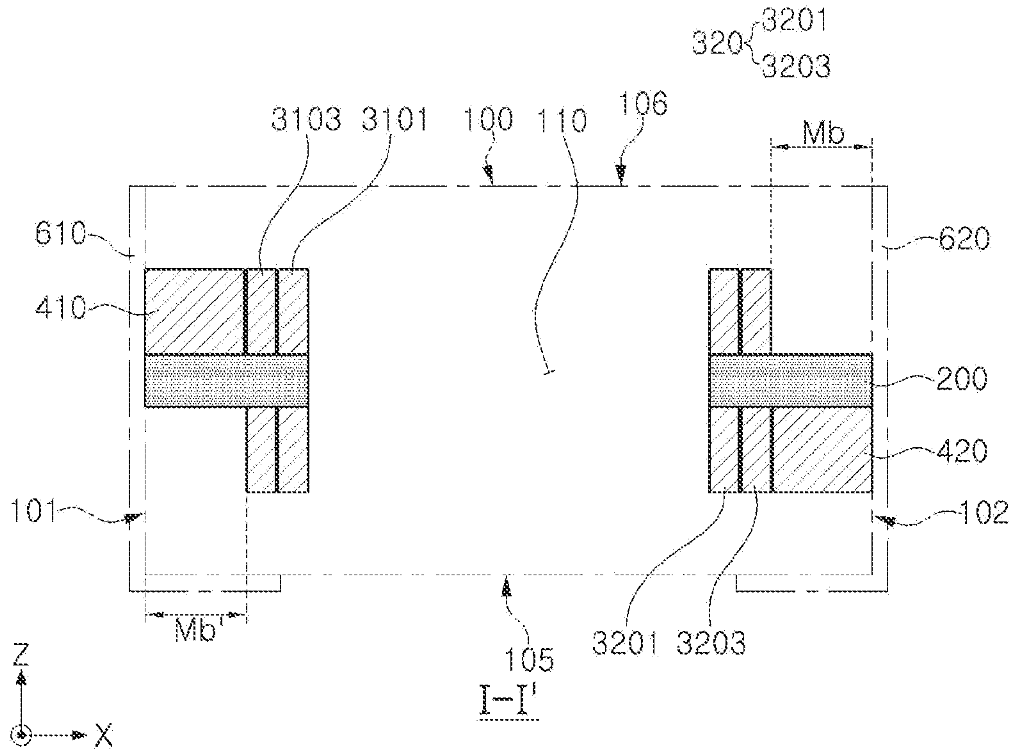
FIG. 3 is a cross-sectional view taken along line I-I' of FIG. 1.

FIG. 1 is a view schematically illustrating a coil component according to a first exemplary embodiment in the present disclosure. FIG. 2 is a schematic top view of the coil component of FIG. 1. FIG. 3 is a cross-sectional view taken along line I-I' of FIG. 1.

Referring to FIGS. 1 through 3, a coil component 1000 according to the present exemplary embodiment may include a body 100, a support substrate 200, first and second coil units 310, 320, first and second lead portions 410 and 420, and first and second external electrodes 610 and 620.

The body 100 forms the exterior of the coil component 1000 according to the present exemplary embodiment and includes the first and second coil units 310 and 320 embedded therein.

The body 100 may be formed in a hexahedral shape as a whole.

Figure 4:
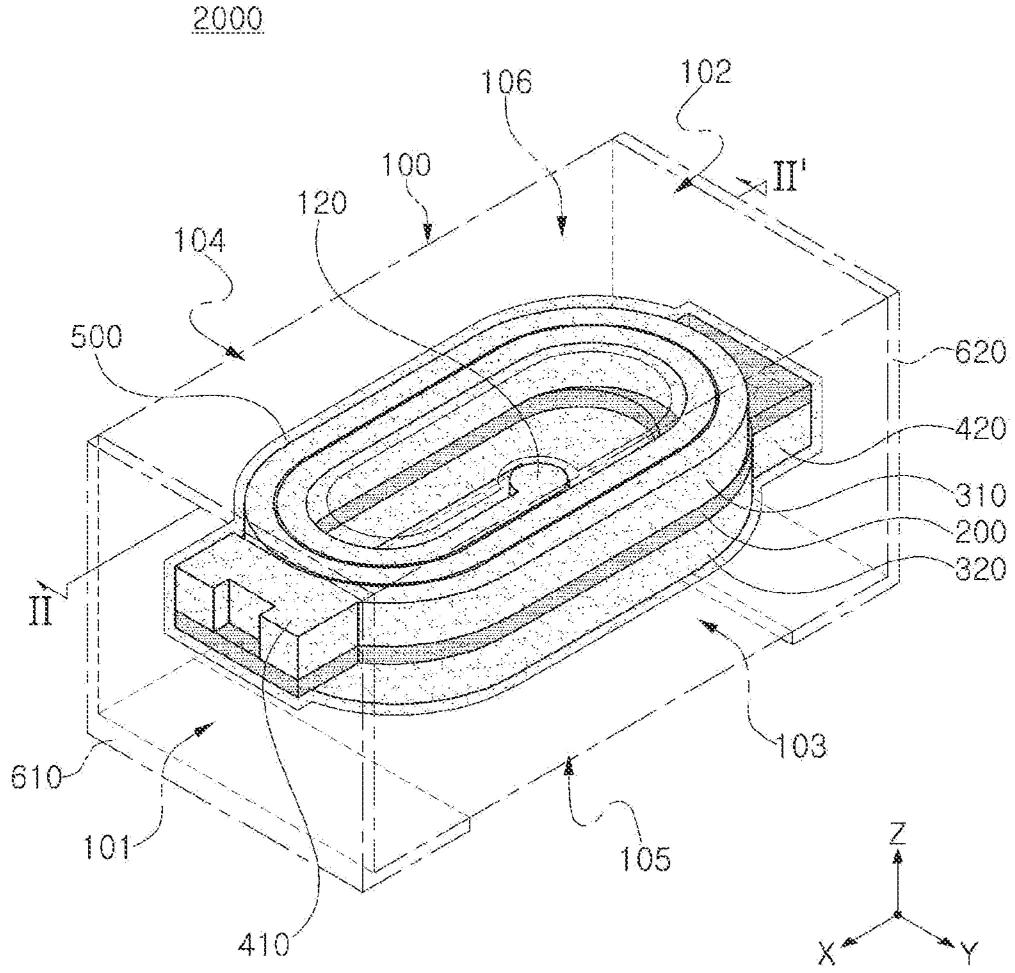
FIG. 4 is a schematic view of a coil component according to a second exemplary embodiment in the present disclosure.

In FIGS. 1 and 4, the body 100 includes a first surface 101 and a second surface 102 opposing each other in the length direction X, a third surface 103 and a fourth surface opposing each other in the width direction Y, and a fifth surface 105 and a sixth surface 106 opposing in the thickness direction Z. Hereinafter, one end surface and the other end surface of the body 100 may refer to the first surface 101 and the second surface 102 of the body 100, and one side surface and the other side surface of the body 100 may refer to the third surface 103 and the fourth surface 104 of the body 100. In the present exemplary embodiment, the first surface 101, the second surface 102, the third surface 103, and the fourth surface 104 of the body 100 are formed to surround a core 110, which will be described later.

By way of example, the body 100 may be formed such that the coil component 1000 according to the present exemplary embodiment including external electrodes 610 and 620 to be described later has a length of 1.0 mm, a width of 0.6 mm, and a thickness of 0.8 mm, but is not limited thereto. Meanwhile, the aforementioned dimensions are merely design values that do not reflect process errors, etc., and thus, it should be appreciated that dimensions within a range admitted as a process error fall within the scope of the present disclosure.

Each of the length, width, and thickness of the coil component 1000 may be measured by a micrometer measurement method. With the micrometer measurement method, each of the length, width, and thickness of the coil component 1000 may be measured by setting a zero point with a gage repeatability and reproducibility (R&R) micrometer, inserting the coil component 1000 into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

Alternatively, the length, width and thickness of the coil component 1000 described above may each be measured by a cross-section analysis method. As an example, based on an optical microscope or a scanning electron microscope (SEM) image of a length directional (L)-thickness directional (Z) cross-section at a width-directional (Y) central portion of the body 100, the length of the coil component 1000 based on the cross-section analysis method may refer to a maximum value among lengths of a plurality of segments parallel to the length direction X of the body 100 when outermost boundary lines of the coil component 1000 illustrated in the image of the cross-section are connected. Alternatively, the length of the coil component 1000 may refer to a minimum value among the lengths of the plurality of segments parallel to the length direction X of the body 100 when outermost boundary lines of the coil component 1000 illustrated in the image of the cross-section are connected. Alternatively, the length of the coil component 1000 may refer to an arithmetic mean value of at least three of the plurality of segments parallel to the length direction X of the body 100 when the outermost boundary lines of the coil component 1000 illustrated in the image of the cross-section are connected. The above description may also be equally applied to the width and thickness of the coil component 1000.

The body 100 has the core 110 penetrating the coil units 310 and 320 and the support substrate 200 to be described later. The core 110 may be formed by filling through-holes (not shown) of the coil units 310 and 320 with a magnetic composite sheet, but is not limited thereto.

The body 100 may include a magnetic material and a resin. As a result, the body 100 has magnetism. The body 100 may be formed by stacking at least one magnetic composite sheet including a resin and a magnetic material is dispersed in the resin. However, the body 100 may have a structure other than the structure in which a magnetic material is dispersed in a resin. For example, the body 100 may be formed of a magnetic material such as ferrite.

The magnetic material may be ferrite or magnetic metal powder.

Ferrite powder may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The magnetic metal powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

The magnetic metal powder may be amorphous or crystalline. For example, the magnetic metal powder may be Fe—Si—B—Cr-based amorphous alloy powder, but is not limited thereto.

Ferrite and the magnetic metal powder may each have an average diameter of about 0.1 μm to 30 μm, but are not limited thereto.

The body 100 may include two or more types of magnetic materials dispersed in a resin. Here, the different types of magnetic materials refer to that magnetic materials dispersed in a resin are distinguished from each other by at least one of an average diameter, a composition, crystallinity, and a shape.

The resin may include, but is not limited to, epoxy, polyimide, liquid crystal polymer, or the like, alone or as a mixture.

The support substrate 200 is disposed within the body 100, has one surface and the other surface opposing each other, and supports the first and second coil units 310 and 320 to be described later. The support substrate 200 may be formed of an insulating material including a thermosetting insulating resin such as an epoxy resin, a thermoplastic insulating resin such as polyimide, or a photosensitive insulating resin or may be formed of an insulating material including such an insulating resin and a reinforcing material such as glass fiber or inorganic filler. As an example, the support substrate 200 may be formed of materials such as prepreg, Ajinomoto build-up film (ABF), FR-4, a bismaleimide triazine (BT) resin, photo imagable dielectric (PID), copper clad laminate (CCL), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. If the support substrate 200 is formed of an insulating material that does not contain glass fibers, the support substrate 200 may reduce the thickness of the first and second coil units overall to thereby reduce a size of the coil component 1000 according to the present exemplary embodiment.

The first and second coil units 310 and 320 are disposed on one surface and the other surface of the support substrate 200 and manifest the characteristics of the coil component. For example, when the coil component 1000 of the present exemplary embodiment is used as a power inductor, the first and second coil units 310 and 320 may serve to stabilize power of an electronic device by storing an electric field as a magnetic field and maintaining an output voltage.

In the case of the present exemplary embodiment, the first and second coil units 310 and 320 are respectively disposed on opposing surfaces of the support substrate 200. Specifically, the first coil unit 310 is disposed on one surface of the support substrate 200 and faces the second coil unit 320 disposed on the other surface of the support substrate 200. The first and second coil units 310 and 320 may be electrically connected to each other through a via 120 penetrating the support substrate 200. Each of the first coil unit 310 and the second coil unit 320 may have a planar spiral shape in which at least one turn is formed around the core 110. Each of the first coil unit 310 and the second coil unit 320 may form a plurality of turns around the core 110 on one surface of the support substrate 200.

Referring to FIG. 2, a plurality of turns of the first coil unit 310 has an outermost turn 3103 adjacent to the first surface 101, the second surface 102, the third surface 103, and the fourth surface 104 of the body 100 and an innermost turn 3101 adjacent to the core 110. Referring to FIG. 3, the plurality of turns of the second coil unit 320 has an outermost turn 3203 adjacent to the first surface 101, the second surface 102, the third surface 103, and the fourth surface 104 and an innermost turn 3201 adjacent to the core 110. Although not specifically shown, each of the plurality of turns of the first coil unit 310 and the second coil unit 320 may further have an intermediate turn connecting the innermost turns 3101 and 3201 and the outermost turns 3103 and 3203. That is, in the present exemplary embodiment, the outermost turn 3103 of the first coil unit 310 may refer to one end of the first coil unit 310 connected to the first lead portion 410 to be described later along a spiral shape. Also, the inner most turn 3101 of the first coil unit 310 refers to the other end of the first coil unit 310 connected to the via 120 along the spiral shape. Similarly, the outermost turn 3203 of the second coil unit 320 refers to one end of the second coil unit 320 connected to the second lead portion 420 to be described later along the spiral shape. Also, the innermost turn 3201 of the second coil unit 320 refers to the other end of the second coil unit 320 connected to the via 120 along the spiral shape.

Referring to FIG. 2, the shortest distance Mb from the outermost turn 3103 of the first coil unit 310 to the second surface 102 of the body 100 may be greater than the shortest distance Ma from the outermost turn 3103 of the first coil unit 310 to the third surface 103 of the body 100. Also, referring to FIG. 2, the shortest distance Mb from the outermost turn 3103 of the first coil unit 310 to the second surface 102 of the body 100 may be greater than the shortest distance Ma' from the outermost turn 3103 of the body 100 to the fourth surface 104 of the body 100. In addition, in the present exemplary embodiment, the shortest distance Ma from the outermost turn 3103 of the first coil unit 310 to the third surface 103 of the body 100 may be substantially the same as the shortest distance Ma' from the outermost turn 3103 to the fourth surface 104 of the body 100 or different from each other, but preferably the same for uniformity of high frequency characteristics. If the shortest distance Mb from the outermost turn 3103 of the first coil unit 310 to the second surface 102 of the body 100 is smaller than the shortest distance Ma from the outermost turn 3103 of the first coil unit 310 to the third surface 103 of the body 100, it may be difficult to secure frequency characteristics for removing high frequency noise. Furthermore, the shortest distance Mb from the outermost turn 3103 of the first coil unit 310 to the second surface 102 of the body 100 may be at least 1.5 times the shortest distance Ma from the outermost turn 3103 of the first coil unit 310 to the third surface 103 of the body 100.

One or ordinary skill in the art would understand that the expression "substantially the same" refers to being the same by allowing process errors, positional deviations, and/or measurement errors that may occur in a manufacturing process.

In one example, a "shortest distance" between two targeted surfaces may mean the minimum distance among distances between the two surfaces measured at multiple locations (e.g., 5) at equal intervals (or non-equal intervals, alternatively). For example, the shortest distance Ma may be the minimum distance among distances from one side surface of the outermost turn 3103 of the first coil unit 310, adjacent to the third surface 103 of the body 100, to the third surface 103 of the body 100, measured at multiple points (e.g., 5) of the one side surface of the outermost turn 3103 in a direction perpendicular to the third surface 103 of the body 100 in a view of the X-Y directions. The shortest distance Mb may be the minimum distance among distances from one side surface of the outermost turn 3103 of the first coil unit 310, adjacent to the second surface 102 of the body 100, to the second surface 102 of the body 100, measured at multiple points (e.g., 5) of the one side surface of the outermost turn 3103 in a direction perpendicular to the second surface 102 of the body 100 in a view of the X-Y directions. Such measured distances at the multiple points may be obtained from a microscopic image(s), e.g., a scanning microscope (SEM) image, of one or more cut surfaces of the body 100. Other methods and/or tools appreciated by one of ordinary skill in the art, even if not described in the present disclosure, may also be used. In addition, the measurement of a shortest distance is not limited these examples, and one of ordinary skill in the art may select the number of measurement points, the interval therebetween, and so forth, if necessary. For example, the number of measurement points may be 3, 5, or 10 per one distance, but is not limited thereto.

On the other hand, according to one exemplary embodiment of the present disclosure, a first margin portion (so-called "L-dicing margin") may refer to a portion of the body 100 disposed between an outermost surface of the first coil unit 310, opposing the first lead portion 410 in the length direction X of the body 100, and the second surface 102 of the body 100 or between an outermost surface of the second coil unit 320, opposing the second lead portion 420 in the length direction X, and the first surface 101 of the body 100. In addition, a second margin portion (so-called "W-dicing margin") may refer to a portion of the body 100 disposed between an outermost surface of the first and second coil units 310 and 320 with respect to the width direction Y and the third surface 103 or the fourth surface 104 of the body 100. A shortest length of the first margin portion in the length direction X may be greater than a shortest distance of the second margin portion in the width direction Y.

Parasitic capacitance may occur between the coil units 310 and 320 and the external electrodes 610 and 620, that is, between the outermost turns 3103 and 3203 of the coil units 310 and 320 and the external electrodes 610 and 620. Typically, when parasitic capacitance increases, a position of a self-resonant frequency (SRF) moves to a low frequency region and an operating frequency range of an inductor becomes narrow. Therefore, attempts have been made to reduce parasitic capacitance by lowering a dielectric constant of a material forming the body 100. That is, a method of increasing the resin content of the body 100 or increasing a distance between magnetic metal powder particles was used. However, the use of only the method may lower permeability of the body 100 to lower inductance capacity.

Therefore, the present disclosure realizes intended frequency characteristics by adjusting a shape of the coil units, without changing the material of the body 100.

Equation 1 below relates to frequency characteristics (SRF) of the coil component.

$$SRF = \frac{1}{2\pi\sqrt{LC}} \quad \text{Equation 1:}$$

Here, L denotes inductance and C denotes capacitance.

Referring to Equation 1, it can be seen that, in order to adjust the position of the self-resonance frequency (SRF), it is necessary to control parasitic capacitance. In the present exemplary embodiment, parasitic capacitance occurring between the coil units 310 and 320 and the external electrodes 610 and 620 may be reduced by increasing the distance Mb from the outermost turn 3103 of the first coil unit 310 to the second surface 102 of the body 100 to be longer than the distance Ma from the outermost turn 3103 of the first coil unit 310 to the third surface 103 of the body 100. As a result, the position of the SRF may be moved to the high frequency region and the operating frequency range of the inductor may be secured.

Meanwhile, the shortest distance Ma from the outermost turn 3103 of the first coil unit 310 to the third surface 103 of the body 100 may be substantially the same as or different from the shortest distance from the outermost turn 3203 of the second coil unit 320 to the third surface 103 of the body 100, but, preferably, equal for uniformity of high frequency characteristics. In addition, the shortest distance Ma' from the outermost turn 3103 of the first coil unit 310 to the fourth surface 104 of the body 100 may be substantially the same or different from the shortest distance from the outermost turn 3203 of the second coil unit 320 to the fourth surface 104 of the body 100, but, preferably, the same for uniformity of high frequency characteristics. In addition, the shortest distance Mb from the outermost turn 3103 of the first coil unit 310 to the second surface 102 of the body 100 and the shortest distance Mb' from the outermost turn 3203 of the second coil unit 320 to the first surface 101 of the body 100 may be substantially the same as or different from each other, but, preferably, the same for uniformity of high frequency characteristics. Therefore, although not specifically shown, a relationship between the shortest distance Mb from the outermost turn 3103 of the first coil unit 310 to the second surface 102 of the body 100 and the shortest distance Ma from the outermost turn 3103 of the first coil unit 310 to the third surface 103 of the body 100 and a relationship between the shortest distance Mb from the outermost turn 3103 of the first coil unit 310 to the second surface 102 of the body 100 and the shortest distance Ma' from the outermost turn 3103 of the first coil unit 310 to the fourth surface 104 of the body 100 may be similarly applied for the second coil unit 320. Specifically, the shortest distance Mb' from the outermost turn 3203 of the second coil unit 320 to the first surface 101 of the body 100 may be greater than the shortest distance from the outermost turn 3203 of the second coil unit 320 to the third surface 103 of the body 100. In addition, the shortest distance Mb' from the outermost turn 3203 of the second coil unit 320 to the first surface 101 of the body 100 may be greater than the shortest distance from the outermost turn 3203 of the second coil unit 320 to the fourth surface 104 of the body 100. Furthermore, preferably, the shortest distance Mb' from the outermost turn 3203 of the second coil unit 320 to the first surface 101 of the body 100 may be 1.5 times or more of the shortest distance from the outermost turn 3203 of the second coil unit 320 to the third surface 103 of the body 100.

One or ordinary skill in the art would understand that the expression "substantially the same" or "substantially equal" refers to being the same by allowing process errors, positional deviations, and/or measurement errors that may occur in a manufacturing process.

Figure 7:
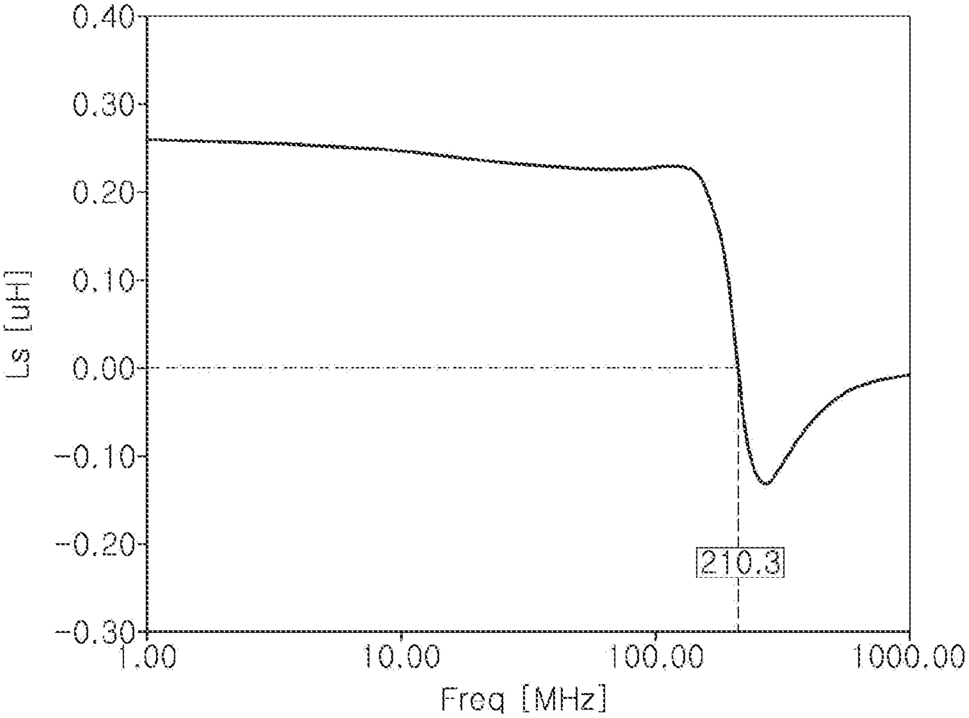
FIG. 7 is a view illustrating a relationship between inductance characteristics and frequency characteristics of the related art coil component.
Figure 8:
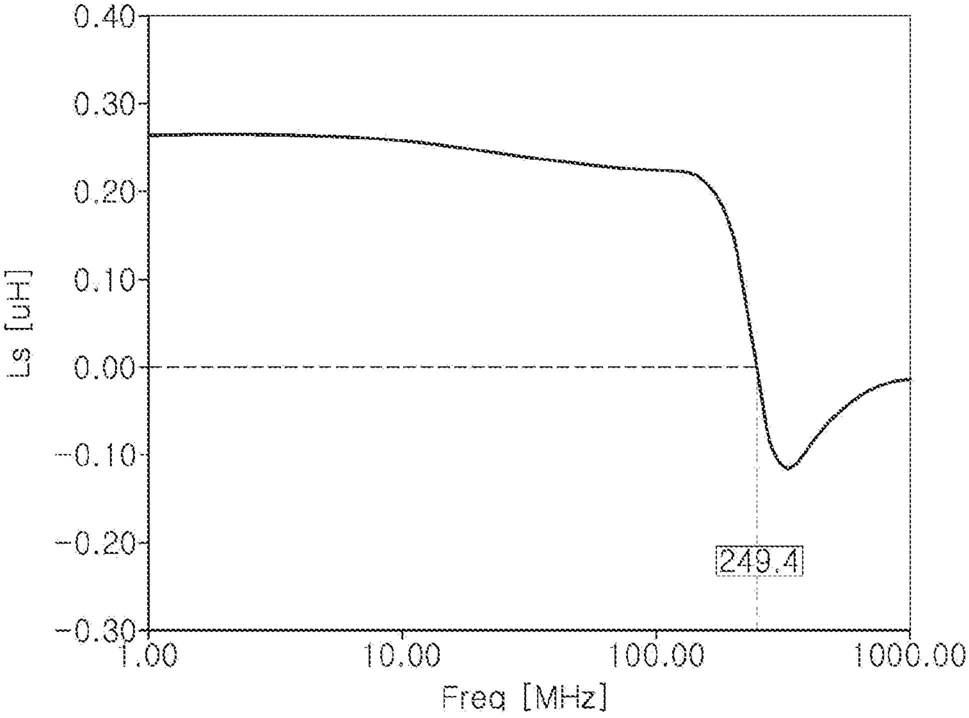
FIG. 8 is a view illustrating a relationship between inductance characteristics and frequency characteristics of a first exemplary embodiment in the present disclosure.
Figure 9:
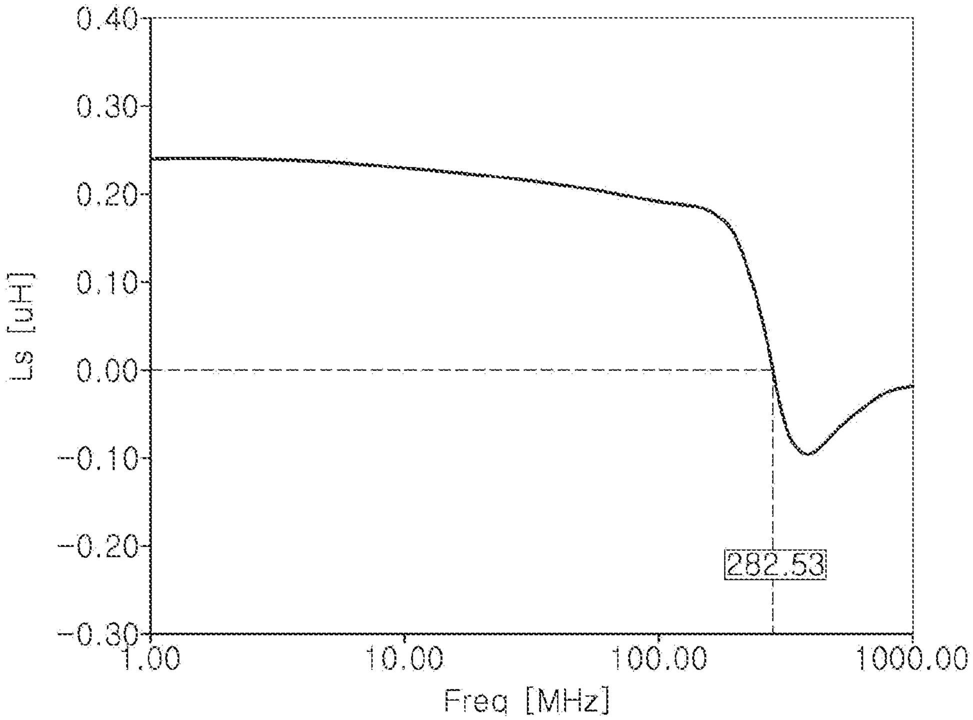
FIG. 9 is a view illustrating a relationship between inductance characteristics and frequency characteristics of the first exemplary embodiment in the present disclosure.

FIG. 7 is a view illustrating a relationship between inductance characteristics and frequency characteristics of the related art coil component. FIG. 8 is a view illustrating a relationship between inductance characteristics and frequency characteristics of a first exemplary embodiment in the present disclosure. FIG. 9 is a view illustrating a relationship between inductance characteristics and frequency characteristics of the first exemplary embodiment in the present disclosure.

FIG. 7 shows frequency characteristics of a coil component in which the shortest distance Mb from the outermost turn 3103 of the first coil unit 310 to the second surface 102 of the body 100 and the shortest distance Ma from the outermost turn 3103 of the first coil unit 310 to the third surface 103 of the body 100 are formed to be the same as 80 μm. FIG. 8 shows frequency characteristics of a coil component in which the shortest distance Mb from the outermost turn 3103 of the first coil unit 310 to the second surface 102 of the body 100 is formed as 180 μm and the shortest distance Ma from the outermost turn 3103 of the first coil unit 310 to the third surface 103 of the body 100 is formed to be 80 μm. FIG. 9 shows frequency characteristics of a coil component in which the shortest distance Mb from the outermost turn 3103 of the first coil unit 310 to the second surface 102 of the body 100 is formed as 280 μm and the shortest distance Ma from the outermost turn 3103 of the first coil unit 310 to the third surface 103 of the body 100 is formed to be 80 μm. Referring to FIGS. 8 and 9, it can be seen that the position of the SRF has moved to the high frequency region, compared with the related art of FIG. 7.

FIGS. 7 through 9 are graphs of measuring frequency characteristics by adjusting the shortest distance Mb from the outermost turn 3103 of the first coil unit 310 to the second surface 102 of the body 100 and the shortest distance Ma from the outermost turn 3103 of the first coil unit 310 to the third surface 103 of the body 100. Comparing FIGS. 7 and 9, it can be seen that frequency characteristics was improved by about 30% or more. That is, when the shortest distance Mb from the outermost turn 3103 of the first coil unit 310 to the second surface 102 of the body 100 is greater than the shortest distance Ma from the outermost turn 3103 of the first coil unit 310 to the third surface 103 of the body 100, the operating frequency range of the coil component may be secured, compared with the related art.

The first and second lead portions 410 and 420 are connected to the first and second coil units 310 and 320 and exposed to the first surface 101 and the second surface 102 of the body 100, respectively. The first lead portion 410 is disposed on one surface of the support substrate 200, and the second lead portion 420 is disposed on the other surface of the support substrate 200 to face the first lead portion 410.

Referring to FIGS. 2 and 3, the first lead portion 410 is connected to the outermost turn 3103 of the first coil unit 310 and exposed to the first surface 101 of the body 100. The second lead portion 420 is connected to the outermost turn 3203 of the second coil unit 320 and exposed to the second surface 102 of the body 100.

Referring to FIG. 2, the first lead portion 410 has a plurality of strip-shaped conductors 4101 and 4102. The plurality of strip-shaped conductors 4101 and 4102 are formed to be spaced apart from each other on the first surface 101 of the body 100, and an inner space between the conductors 4101 and 4102 may be filled with the body 100. As a result, a bonding force and inductance characteristics of the entirety of the body 100 and the first coil unit 310 may be improved. In addition, when the first lead portion 410 has a plurality of strip-shaped conductors 4101 and 4102, an overplating phenomenon that may occur during the formation of the first lead portion 410 may be alleviated. As a result, variations in plating thickness between the first coil unit 310 and the first lead portion 410 may be reduced. In the present exemplary embodiment, the shape of the first lead portion 410 is not limited to the shape described above, and a person skilled in the art may appropriately change design as necessary. Meanwhile, in the present exemplary embodiment, only the first lead portion 410 is described for convenience of explanation, but the description of the plurality of strip-shaped conductors 4101 and 4102 of the first lead portion 410 may similarly be applied to the second lead portion 420. Therefore, although not specifically shown, the second lead portion 420 may also include a plurality of strip-shaped conductors.

The first coil unit 310 and the first lead portion 410 may be integrally formed so that a boundary may not be formed therebetween. However, this is only an example and a case in which the aforementioned components are formed at different stages to form a boundary between each other is not excluded from the scope of the present disclosure. In the present exemplary embodiment, for convenience, the first coil unit 310 and the first lead portion 410 are described, but the same description may also be applied to the second coil unit 320 and the second lead portion 420.

At least one of the first coil unit 310, the first lead portion 410, and the via 120 may include at least one conductive layer.

As an example, when the first coil unit 310, the first lead portion 410, and the via 120 are formed by plating on one surface of the support substrate 200, the first coil unit 310, the first lead portion 410, and the via 120 may each include a seed layer and a plating layer. The seed layer may be formed by an electroless plating method or a vapor deposition method such as sputtering. The seed layer is formed according to a shape of the first coil unit 310 on the whole. A thickness of the seed layer is not limited, but is made to be thinner than the plating layer. Next, a plating layer may be disposed on the seed layer. As a non-limiting example, the plating layer may be formed using electroplating. Each of the seed layer and the plating layer may have a single layer structure or a multilayer structure. The multilayered plating layer may be formed in a conformal film structure in which one plating layer is covered by another plating layer or may be formed in a form in which the other plating layer is stacked on only one surface of any one plating layer.

The seed layer of the first coil unit 310, the seed layer of the first lead portion 410, and the seed layer of the via 120 may be integrally formed so that a boundary may not be formed therebetween, but is not limited thereto.

The seed layer and the plating layer of each of the first coil unit 310, the first lead portion 410, and the via 120 may be formed of a conductive material such as copper (Cu), aluminum (Al), silver (Ag), tin (Sn), gold (Au), nickel (Ni), lead (Pb), titanium (Ti), molybdenum (Mo), or alloys thereof, but is not limited thereto.

The first and second external electrodes 610 and 620 cover the first and second lead portions 410 and 420. When the coil component 1000 according to the present exemplary embodiment is mounted on a printed circuit board (PCB) or the like, the first and second external electrodes 610 and 620 electrically connect the coil component 1000 to the PCB. As an example, the coil component 1000 according to the present exemplary embodiment may be mounted such that the fifth surface 105 of the body 100 faces an upper surface of the PCB, and here, since the first and second external electrodes 610 and 620 are spaced apart from each other on the fifth surface 105 of the body 100, a connection part of the PCB may be electrically connected.

The first and second external electrodes 610 and 620 may include at least one of a conductive resin layer and an electroplating layer. The conductive resin layer may be formed by printing a conductive paste on a surface of the body 100 and curing the paste. The conductive paste may include any one or more conductive metals selected from the group consisting of copper (Cu), nickel (Ni), and silver (Ag), and a thermosetting resin. The electroplating layer may include at least one selected from the group consisting of nickel (Ni), copper (Cu), and tin (Sn). In the present exemplary embodiment, the first and second external electrodes 610 and 620 may include a first layer (not shown) formed on the surface of the body 100 and are disposed in direct contact with the first and second lead portions 410 and 420 and a second layer (not shown) disposed on the first layer (not shown). For example, the first layer (not shown) may be a nickel (Ni) plating layer, and the second layer (not shown) may be a tin (Sn) plating layer, but is not limited thereto.

Second Exemplary Embodiment

Figure 5:
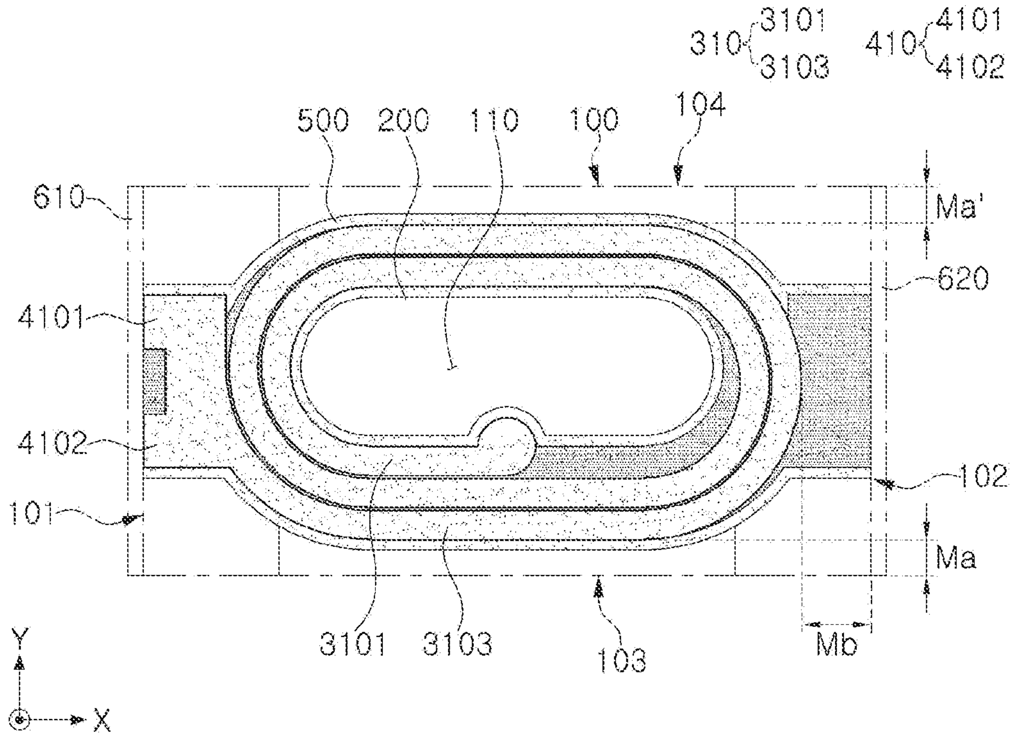
FIG. 5 is a schematic top view illustrating the coil component of FIG. 4.
Figure 6:
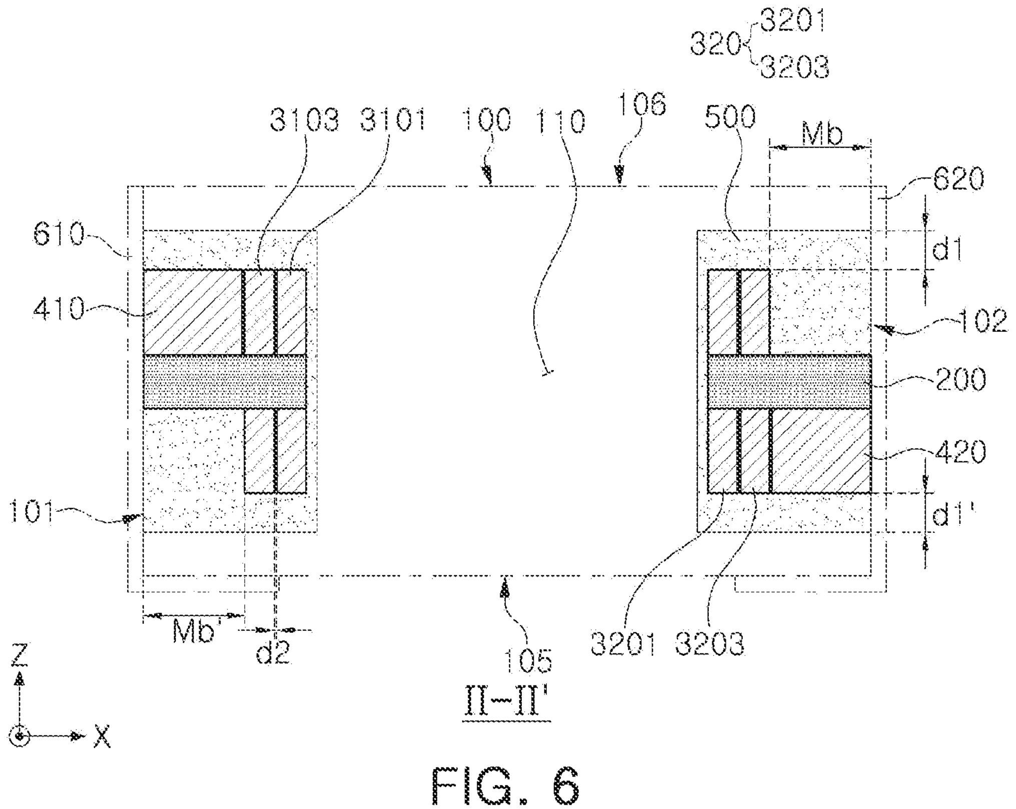
FIG. 6 is a cross-sectional view taken along line II-II' of FIG. 4.

FIG. 4 is a schematic view of a coil component according to a second exemplary embodiment in the present disclosure. FIG. 5 is a schematic top view illustrating the coil component of FIG. 4. FIG. 6 is a cross-sectional view taken along line II-II' of FIG. 4.

Referring to FIGS. 4 through 6, a coil component 2000 according to the present exemplary embodiment includes an insulating layer 500, compared to the coil component 1000 according to the first exemplary embodiment in the present disclosure. Therefore, in describing the present exemplary embodiment, only the insulating layer 500 different from the first exemplary embodiment in the present disclosure will be described. For the rest of the components of the present exemplary embodiment, the description in the first exemplary embodiment in the present disclosure may be applied as it is.

Referring to FIGS. 4 and 5, the insulating layer 500 is disposed between the first and second coil units 310 and 320 and the body 100. In the present exemplary embodiment, the body 100 includes magnetic metal powder particles, and thus, the insulating layer 500 is disposed between the first and second coil units 310 and 320 and the body 100 to insulate the first and second coil units 310 and 320. The insulating layer 500 may be disposed on the surfaces of the first and second coil units 310 and 320 to fill a space between a plurality of turns.

In the present exemplary embodiment, a surface of the first coil unit 310 in contact with one surface of the support substrate 200 may be referred to as a lower surface of the first coil unit 310, and a surface of the first coil unit 310 reaching a maximum height of the first coil unit based on the thickness direction Z of the body 100 may be referred to as an upper surface of the first coil unit 310.

Referring to FIG. 6, a distance d1 from an upper surface of the first coil unit 310 to an upper surface of the insulating layer 500 may be greater than or equal to a distance d2 between a plurality of turns. In the present exemplary embodiment, the distance d1 from the upper surface of the first coil unit 310 to the upper surface of the insulating layer 500 may exceed 5 μm and may be 10 μm or more. That is, a thickness of the insulating layer 500 is not limited as long as inductance characteristics and frequency characteristics are adjusted to an appropriate level within a range in which the distance d1 from the upper surface of the first coil unit 310 to the upper surface of the insulating layer 500 is greater than or equal to the distance d2 between the plurality of turns. However, if the distance d1 from the upper surface of the first coil unit 310 to the upper surface of the insulating layer 500 is smaller than the distance d2 between the plurality of turns, inductance characteristics may be deteriorated.

In one example, a "distance" from one surface to another surface may mean an average distance of distances between the two surfaces measured at multiple locations (e.g., 5) at equal intervals (or non-equal intervals, alternatively). For example, the distance d1 in FIG. 6 may be an average distance of distances from the upper surface of the first coil unit 310 to the upper surface of the insulating layer 500, measured at multiple points (e.g., 5) of the upper surface of the first coil unit 310 in a direction perpendicular to the upper surface of the first coil unit 310 (e.g., Z direction) in a view of the X-Z directions. The distance d2 in FIG. 6 may be an average distance of multiple distance values measured at multiple locations of the plurality of turns of the first coil unit 310 or the second coil unit 320. Each measured distance may be a gap distance between two inner wall surfaces of adjacent turns facing each other. Such measured distances at the multiple locations may be obtained from a microscopic image(s), e.g., a scanning microscope (SEM) image, of one or more cut surfaces of the body 100. Other methods and/or tools appreciated by one of ordinary skill in the art, even if not described in the present disclosure, may also be used. In addition, the measurement of a distance is not limited these examples, and one of ordinary skill in the art may select the number of measurement points, the interval therebetween, and so forth, if necessary. For example, the number of measurement points may be 3, 5, or 10 per one distance, but is not limited thereto. Alternatively, a "distance" from one surface to another surface may mean a distance between the two surfaces measured at a predetermined location of the targeted surfaces.

As an example, in order to realize the first coil unit 310 having a high aspect ratio, a shape of the first coil unit 310 may be adjusted and DC resistance characteristics Rdc is improved by utilizing the insulating layer 500 as a plating growth guide. After the aforementioned seed layer is attached on the support substrate 200, the insulating layer 500 having a shape of a partition wall is disposed on the support substrate 200. Thereafter, the first coil unit 310 having a plating layer on the seed layer is formed by electroplating. The insulating layer 500 may be formed of a resin including an epoxy resin, and here, one or two or more epoxy resins may be used. In addition, as another non-limiting example, the insulating layer 500 may be formed of an insulating material that fills a space after a photosensitive resin is removed from the space. Specifically, after the first coil unit 310 is formed, the photosensitive resin formed between a plurality of turns of the first coil unit 310 is removed by a stripping solution, and then a space between the plurality of turns of the first coil unit 310, from which the photosensitive resin was removed, may be filled with such an insulating material. In addition, the first coil unit 310 may be wrapped with such an insulating material. As an example, the insulating layer 500 may be formed of a thin parylene film. However, the present disclosure is not limited thereto, and the insulating layer 500 may also be formed by a spray coating method.

Figure 10:
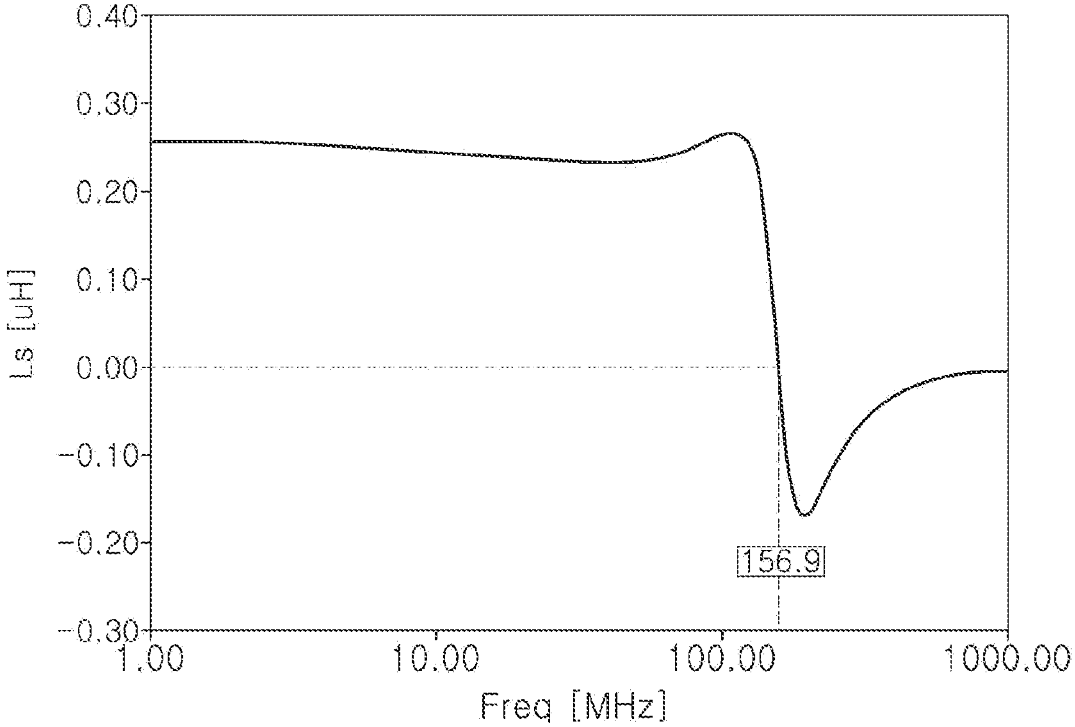
FIG. 10 is a view illustrating a relationship between inductance characteristics and frequency characteristics of the related art coil component.
Figure 11:
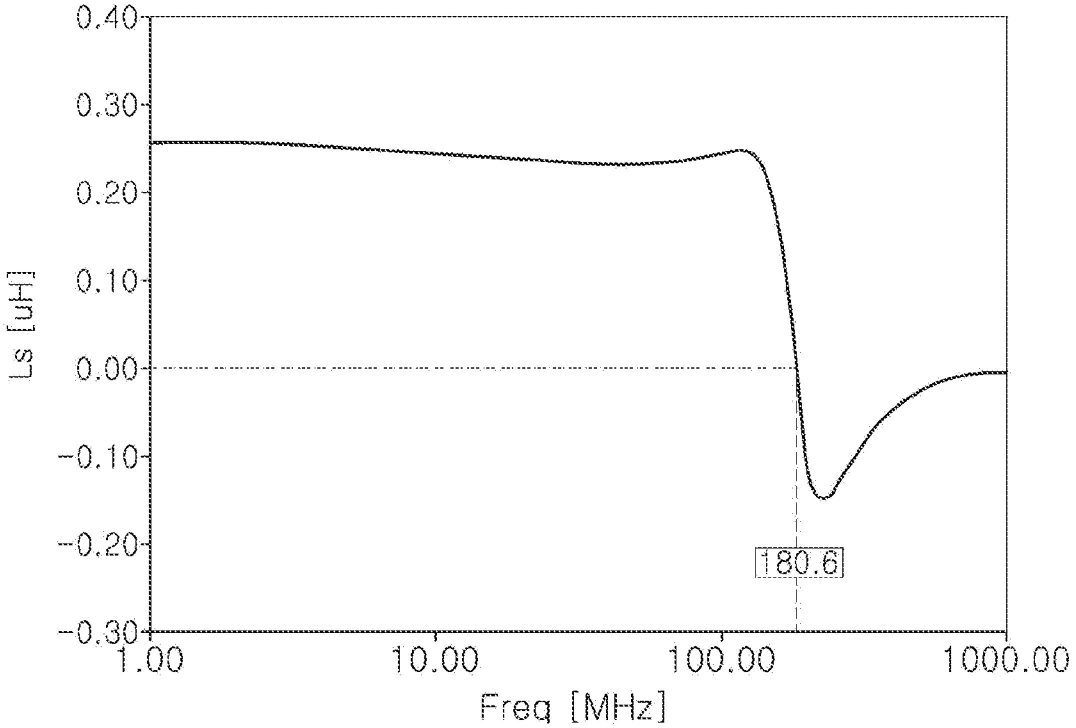
FIG. 11 is a view illustrating a relationship between inductance characteristics and frequency characteristics of a second exemplary embodiment in the present disclosure.
Figure 12:
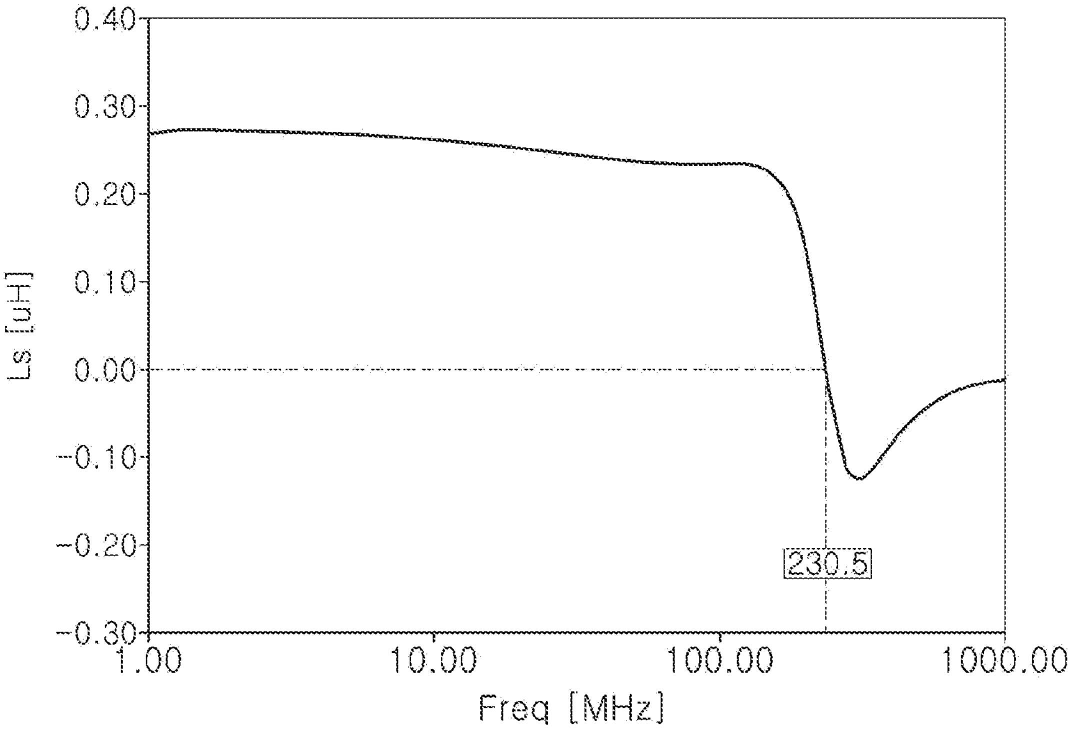
FIG. 12 is a view illustrating a relationship between inductance characteristics and frequency characteristics of the second exemplary embodiment in the present disclosure.

FIG. 10 is a view illustrating a relationship between inductance characteristics and frequency characteristics of the related art coil component. FIG. 11 is a view illustrating a relationship between inductance characteristics and frequency characteristics of a second exemplary embodiment in the present disclosure. FIG. 12 is a view illustrating a relationship between inductance characteristics and frequency characteristics of the second exemplary embodiment in the present disclosure.

FIG. 10 shows frequency characteristics of a coil component in which the shortest distance from the outermost turn 3103 of the first coil unit 310 to the second surface 102 of the body 100 and the shortest distance from the outermost turn 3103 of the first coil unit 310 to the third surface 103 of the body 100 were formed to be the same as 80 μm and a distance from the upper surface of the first coil unit 310 to the upper surface of the insulating layer 500 was formed to be 5 μm. FIG. 11 shows frequency characteristics of a coil component in which the shortest distance Mb from the outermost turn 3103 of the first coil unit 310 to the second surface 102 of the body 100 was formed to be 180 μm and the shortest distance Ma from the outermost turn 3103 of the first coil unit 310 to the third surface 103 of the body 100 was formed to be 80 μm and the distance d1 from the upper surface of the first coil unit 310 to the upper surface of the insulating layer 500 was formed to be 5 μm. FIG. 12 shows frequency characteristics of a coil component in which the shortest distance Mb from the outermost turn 3103 of the first coil unit 310 to the second surface 102 of the body 100 was formed to be 280 μm and the shortest distance Ma from the outermost turn 3103 of the first coil unit 310 to the third surface 103 of the body 100 was formed to be 80 μm and the distance d1 from the upper surface of the first coil unit 310 to the upper surface of the insulating layer 500 was formed to be 10 μm.

FIGS. 10 through 12 are graphs showing frequency characteristics measured by adjusting the shortest distance Mb from the outermost turn 3103 of the first coil unit 310 to the second surface 102 of the body 100, the shortest distance Ma from the outermost turn 3103 of the first coil unit 310 to the third surface 103 of the body 100, and a thickness of the insulating layer 500 additionally. When comparing FIGS. 10 and 12, it can be seen that frequency characteristics are improved by about 45% or more. In other words, referring to FIGS. 11 and 12, it can be seen that the position of SRF has moved to a higher frequency region than in the case of FIG. 10 of the related art. In other words, the operating frequency range of the coil component may be secured, compared to the related art, when the shortest distance Mb from the outermost turn 3103 of the first coil unit 310 to the second surface 102 of the body 100 is greater than the shortest distance Ma from the outermost turn 3103 of the first coil unit 310 to the third surface 103 of the body 100.

Meanwhile, in the related art coil component, the insulating layer 500 is disposed at a level similar to the distance between the turns of the first coil unit 310. In other words, in the related art coil component, the thickness of the insulating layer 500 between the first coil unit 310 and the body 100 is formed to be as thin as 5 μm, which is the distance between the turns of the first coil unit 310. Meanwhile, as in the first exemplary embodiment in the present disclosure, when the shortest distance Mb from the outermost turn 3103 of the first coil unit 310 to the second surface 102 of the body 100 is greater than the shortest distance Ma from the outermost turn 3103 of the first coil unit 310 to the third surface 103 of the body 100, the length of the turns of the first coil unit 310 may be shortened as much to degrade inductance characteristics. In the present exemplary embodiment, by disposing the insulating layer 500 thicker than the related art, a height of the first coil unit 310 is relatively lowered in the component, whereby inductance characteristics of the component may be secured compared to the first exemplary embodiment in the present disclosure. In other words, referring to FIGS. 11 and 12, it can be seen that inductance characteristics Ls is improved compared to the cases of FIGS. 8 and 9. That is, in the present exemplary embodiment, by forming the insulating layer 500 having a predetermined thickness or greater between the first coil unit 310 and the body 100, parasitic capacitance between the first coil unit 310 and the first external electrode 610 may be lowered and inductance characteristics of the component may be secured.

In the present exemplary embodiment, a surface of the second coil unit 320 in contact with the other surface of the support substrate 200 may be referred to as a lower surface of the second coil unit 320, and a surface of the second coil unit 320 reaching a maximum height of the second coil unit 320 based on the thickness direction Z of the body 100 may be referred to as an upper surface of the second coil unit 320. Referring to FIG. 6, a distance d1' from an upper surface of the second coil unit 320 to an upper surface of the insulating layer 500 may be greater than or equal to the distance d2 between a plurality of turns. In the present exemplary embodiment, for convenience of explanation, only the insulating layer 500 of the first coil unit 310 is described, but the same description may also be applied to the insulating layer 500 of the second coil unit 320.

As set forth above, according to an exemplary embodiment, corrosion or precipitation of external electrodes is prevented and reliability of a coil component is improved.

As set forth above, according to an exemplary embodiment, the coil component having improved frequency characteristics by minimizing parasitic capacitance is provided.

In addition, according to the present disclosure, the coil component having improved inductance characteristics of a body having a limited volume is provided.

While example exemplary embodiments have been shown and described above, it will be apparent to those skilled in the art that modifications and variations could be made without departing from the scope of the present disclosure as defined by the appended claims.

What is claimed is:

1. A coil component comprising:

a body having a first end surface and a second end surface opposing each other and a first side surface and a second side surface connecting the first end surface and the second end surface and opposing each other;

a support substrate disposed within the body and having a first surface and a second surface opposing each other in a thickness direction;

first and second coil units disposed on the first surface and the second surface of the support substrate, respectively, and each including a plurality of turns; and first and second lead portions connected to the first and second coil units and exposed to the first end surface and the second end surface of the body, respectively, wherein a shortest distance from an outermost turn of the first coil unit to the second end surface of the body is greater than a shortest distance from the outermost turn of the first coil unit to the first side surface of the body, and the shortest distance from the outermost turn of the first coil unit to the second end surface of the body is greater than a shortest distance from a side surface of the support substrate to the first side surface of the body.

2. The coil component of claim 1, wherein the shortest distance from the outermost turn of the first coil unit to the second end surface of the body is greater than a shortest distance from the outermost turn of the first coil unit to the second side surface of the body.

3. The coil component of claim 1, wherein the shortest distance from the outermost turn of the first coil unit to the first side surface of the body and a shortest distance from the outermost turn of the first coil unit to the second side surface of the body are substantially equal to each other.

4. The coil component of claim 1, wherein the shortest distance from the outermost turn of the first coil unit to the second end surface of the body and a shortest distance from an outermost turn of the second coil unit to the first end surface of the body are substantially equal to each other.

5. The coil component of claim 1, wherein the shortest distance from the outermost turn of the first coil unit to the second end surface of the body is at least 1.5 times the shortest distance from the outermost turn of the first coil unit to the first side surface of the body.

6. The coil component of claim 1, further comprising an insulating layer disposed between the first and second coil units and the body.

7. The coil component of claim 6, wherein the insulating layer is disposed on surfaces of the first and second coil units to fill space between the plurality of turns.

8. The coil component of claim 6, wherein a distance from an upper surface of the first coil unit to an upper surface of the insulating layer is greater than or equal to a distance between the plurality of turns.

9. The coil component of claim 6, wherein a distance from an upper surface of the second coil unit to an upper surface of the insulating layer is greater than or equal to a distance between the plurality of turns.

10. The coil component of claim 8, wherein the distance from the upper surface of the first coil unit to the upper surface of the insulating layer is 10 μm or greater.

11. The coil component of claim 1, wherein the first and second lead portions have a plurality of conductors in a strip shape, and a portion of the support substrate overlaps, in the thickness direction, a space between the plurality of conductors.

12. The coil component of claim 1, further comprising first and second external electrodes covering the first and second lead portions, respectively.

13. A coil component comprising:

a body having a first end surface and a second end surface opposing each other in a first direction and a first side surface and a second side surface connecting the first end surface and the second end surface and opposing each other in a second direction;

a support substrate disposed within the body;

a coil unit disposed on at least one surface of the support substrate and including a plurality of turns;

first and second lead portions extending from two opposing ends of the coil unit and exposed to the first end surface and the second end surface of the body, respectively, wherein the body includes a first margin portion disposed between an outermost surface of the coil unit, opposing the first lead portion in the first direction, and the second end surface of the body or between an outermost surface of the coil unit, opposing the second lead portion in the first direction, and the first end surface of the body, the body further includes a second margin portion disposed between an outermost surface of the coil unit with respect to the second direction and the first or second side surface of the body, a shortest length of the first margin portion in the first direction is greater than a shortest distance of the second margin portion in the second direction, and a shortest distance from an outermost turn of the coil unit to the second end surface of the body in the first direction is greater than a shortest distance from a side surface of the support substrate to the first side surface of the body in the second direction.

14. The coil component of claim 13, wherein a ratio of the shortest length of the first margin portion in the first direction to the shortest distance of the second margin portion in the second direction is more than or equal to 1.5.

15. The coil component of claim 13, further comprising an insulating layer disposed between the coil unit and the body.

16. The coil component of claim 15, wherein the insulating layer is disposed on surfaces of the coil unit to fill space between the plurality of turns.

17. The coil component of claim 15, wherein a distance from an upper surface of the coil unit to an upper surface of the insulating layer is greater than or equal to a distance between the plurality of turns.

18. The coil component of claim 17, wherein the distance from the upper surface of the coil unit to the upper surface of the insulating layer is 10 μm or greater.

19. The coil component of claim 13, wherein the first margin portion is disposed on and in contact with a surface of the support substrate, and the second margin portion does not overlap the support substrate in a third direction perpendicular to the first and second directions.

20. The coil component of claim 13, further comprising first and second external electrodes disposed on the first and second end surfaces of the body and connected to the first and second lead portions, respectively.

* * * * *